United States Patent
Lan et al.

(10) Patent No.: US 10,211,894 B2
(45) Date of Patent: Feb. 19, 2019

(54) DOWNLINK PRECODING METHOD AND BASE STATION

(71) Applicant: NTT DOCOMO, INC., Beijing (CN)

(72) Inventors: Yang Lan, Beijing (CN); Anxin Li, Beijing (CN); Huiling Jiang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 15/744,117

(22) PCT Filed: Jul. 12, 2016

(86) PCT No.: PCT/CN2016/089767
§ 371 (c)(1),
(2) Date: Jan. 12, 2018

(87) PCT Pub. No.: WO2017/008731
PCT Pub. Date: Jan. 19, 2017

(65) Prior Publication Data
US 2018/0205428 A1    Jul. 19, 2018

(30) Foreign Application Priority Data
Jul. 14, 2015  (CN) .......................... 2015 1 0412104

(51) Int. Cl.
*H04K 1/10* (2006.01)
*H04L 27/28* (2006.01)
(Continued)

(52) U.S. Cl.
CPC ............. *H04B 7/0456* (2013.01); *H04B 7/04* (2013.01); *H04B 17/309* (2015.01); *H04W 72/1273* (2013.01)

(58) Field of Classification Search
CPC .... H04B 7/0456; H04B 17/309; H04B 7/024; H04W 72/1273
(Continued)

(56) References Cited

U.S. PATENT DOCUMENTS

| | | | |
|---|---|---|---|
| 8,948,800 B2 * | 2/2015 | Amin | H04B 7/024 455/403 |
| 2010/0002800 A1 | 1/2010 | Kim et al. | |
| 2011/0194593 A1 | 8/2011 | Geirhofer et al. | |

FOREIGN PATENT DOCUMENTS

| | | |
|---|---|---|
| CN | 102484870 A | 5/2012 |
| CN | 103634068 A | 3/2014 |
| CN | 104205980 A | 12/2014 |

OTHER PUBLICATIONS

International Search Report for PCT/CN2016/089767, ISA/CN, Haidian District, Beijing, dated Oct. 8, 2016 with English translation thereof.

* cited by examiner

*Primary Examiner* — Phuong Phu
(74) *Attorney, Agent, or Firm* — Harness, Dickey & Pierce, P.L.C.

(57) ABSTRACT

Disclosed are a downlink precoding method and a base station. The method includes: configuring a first precoding mode for a first cell, wherein the first precoding mode includes information of a precoding matrix configured for each candidate user of the first cell on each resource; selecting a scheduling user on each resource from candidate users according to the first precoding mode; and performing precoding to a channel estimation signal and downlink data of the scheduling user according to a precoding matrix of the scheduling user, and transmitting precoded channel estimation signal and precoded downlink data to the scheduling user. Such method and base station of the present disclosure (Continued)

can reduce the feedback overhead of the user, effectively improve the accuracy of channel quality indicator (CQI) estimation, and improve the system throughput and user throughput.

13 Claims, 6 Drawing Sheets

(51) Int. Cl.
    *H04B 7/0456*    (2017.01)
    *H04B 7/04*       (2017.01)
    *H04B 17/309*    (2015.01)
    *H04W 72/12*     (2009.01)

(58) Field of Classification Search
    USPC .................. 375/260, 346, 219, 220, 222
    See application file for complete search history.

DOWNLINK PRECODING METHOD AND BASE STATION

CROSS-REFERENCE TO RELATED APPLICATIONS

This application is a U.S. National Phase application under 35 U.S.C. § 371 of International Application No. PCT/CN2016/089767, filed Jul. 12, 2016, entitled "DOWNLINK PRECODING METHOD AND BASE STATION", the entire contents of which is incorporated herein by reference.

FIELD OF THE DISCLOSURE

The present disclosure relates to wireless communications techniques, and more particularly, to a downlink precoding method and a base station.

BACKGROUND OF THE DISCLOSURE

In wireless communications systems, when a base station schedules downlink transmissions, user equipment (UE) needs to estimate a Signal To Interference And Noise Ratio (SINR) of received signals, determine a Channel Quality Indicator (CQI) and feed back the CQI to the base station via uplink resources. The base station determines scheduling information such as wireless resources and modulation and coding scheme according to the received CQI.

SUMMARY OF THE DISCLOSURE

Various embodiments of the present disclosure provide a downlink precoding method and a base station, so as to improve downlink scheduling accuracy. Accordingly, system throughput and user throughput may also be improved to some extent.

The technical solution of according to various embodiments of the present disclosure is as follows.

A downlink precoding method, including:
configuring a first precoding mode for a first cell, wherein the first precoding mode includes information of a precoding matrix configured for each candidate user of the first cell on each resource;
selecting a scheduling user on each resource from candidate users according to the first precoding mode; and
performing precoding to a channel estimation signal and downlink data of the scheduling user according to a precoding matrix of the scheduling user, and transmitting precoded channel estimation signal and precoded downlink data to the scheduling user.

A base station, including:
a configuring module, to configure a first precoding mode for a first cell, wherein the first precoding mode records information of a precoding matrix of each candidate user on each resource;
a scheduling module, to select a scheduling user from candidate users for each resource according to the first precoding mode;
a precoding module, to perform precoding to a channel estimation signal and downlink data of the scheduling user according to a precoding matrix of the scheduling user; and
a transmitting module, to transmit precoded channel estimation signal and precoded downlink data to the scheduling user.

A base station, including:
a memory;
one or more processors; wherein
the memory stores one or more instruction units executable by the one or more processors, the instruction units include a configuring module, a scheduling module, a precoding module and a transmitting module; wherein
the configuring module is to configure a first precoding mode for a first cell, wherein the first precoding mode records information of a precoding matrix of each candidate user on each resource;
the scheduling module is to select a scheduling user from candidate users for each resource according to the first precoding mode;
the precoding module is to perform precoding to a channel estimation signal and downlink data of the scheduling user according to a precoding matrix of the scheduling user; and
the transmitting module is to transmit precoded channel estimation signal and precoded downlink data to the scheduling user.

DETAILED DESCRIPTION OF THE DISCLOSURE

The present disclosure is described in further detail hereinafter wither reference to accompanying drawings and embodiments to make the technical solution therein clearer.

When determining the CQI, the UE cannot know accurate Inter-Cell Interference (ICI) from other cells during practical downlink transmission. Therefore, it is less accurate for the base station to perform downlink scheduling according to the CQI fed back by the UE. For example, there may be a larger difference between the modulation and coding scheme estimated according to the CQI fed back by the UE and the optimal modulation and coding scheme can be adopted by the UE during the practical downlink transmission, which may decrease the throughput of the cell and the spectrum utilization of the user.

Figure 1:
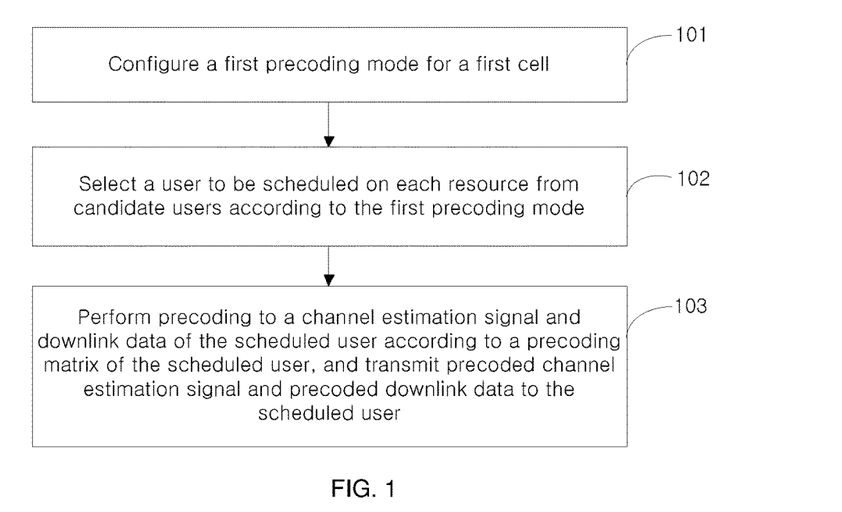
FIG. 1 is a flowchart illustrating a downlink precoding method according to various embodiments of the present disclosure.

FIG. 1 is a flowchart illustrating a downlink precoding method provided by various embodiments of the present disclosure. The method includes the following.

At block 101, a first precoding mode is configured for a first cell, the first precoding mode records information of a precoding matrix configured for respective candidate user of the first cell on respective resource.

In this block, the resource may be a time-frequency resource unit, e.g., a resource block (RB) or a subband in a Long-term evolution (LTE) system. The information of the precoding matrix may be an index of a precoding matrix in a preconfigured codebook, referred to as a PMI. On each resource, a PMI may be configured for each single candidate user, e.g., the base station and the UE of the first cell perform Single User Multiple Input Multiple Output (SU-MIMO) transmission. Or, multiple PMIs may be configured respectively for multiple candidate users (i.e. user group) on the resource, e.g., the base station and the multiple candidate users perform Multi-User Multiple Input Multiple Output (MU-MIMO) transmission or Non-Orthogonal Multiple Access (NOMA) transmission.

In various embodiments of the present disclosure, the first precoding mode may be shown by creating a PMI mapping table. Table 1 shows a PMI mapping table. On each subband, a PMI is respectively configured for one or more candidate users. As shown in Table 1, the subband index is from 1 to 8; there are three candidate users (group): user pair UE1 and UE2, single user UE1 and single user UE2. The information of the precoding matrix includes two PMIs: PMI1 and PMI2, which indicate the indexes of two PMIs in the codebook preconfigured in the base station of the first cell.

In the first precoding mode shown in Table 1, on subband 1, UE1 is configured to use PMI1 and UE2 is configured to use PMI2; or UE2 is configured to use PMI2 on subband 1. On subband 2, UE1 and UE2 are configured to use PMI2; or UE1 is configured to use PMI2 on subband 2, or UE2 is configured to use PMI2 on subband 2, etc.

TABLE 1 the first precoding mode - PMI mapping table

| Candidate users (group) | | Subband index | | | | | | |
|---|---|---|---|---|---|---|---|---|
| | 1 | 2 | 3 | 4 | 5 | 6 | 7 | 8 |
| 1 UE1 | PMI1 | PMI2 | PMI1 | PMI2 | PMI1 | PMI1 | PMI2 | PMI1 |
| UE2 | PMI2 | PMI2 | PMI2 | PMI2 | PMI2 | PMI1 | PMI1 | PMI1 |
| 2 UE1 | — | PMI2 | — | PMI2 | — | PMI1 | — | PMI1 |
| 3 UE2 | PMI2 | PMI2 | PMI2 | — | — | PMI1 | PMI2 | PMI1 |

At block 102, a user to be scheduled on each resource is selected from candidate users according to the first precoding mode.

The first precoding mode indicates all possible users or user groups on each resource. A scheduled user may be determined according to a certain criteria. Meanwhile, according to the first precoding mode, the precoding matrix used by the scheduled user is determined.

In various embodiments, the criteria may include: polling, maximum carrier interference ratio (C/I), proportion fair (PF) algorithm, etc.

At block 103, precoding is performed to channel estimation signal and downlink data of the scheduled user according to the precoding matrix of the scheduled user, and precoded channel estimation signal and downlink data are transmitted to the scheduled user.

In this block, the base station of the first cell transmits precoded channel estimation signal to the scheduled user, after receiving the CQI fed back by the scheduled user according to the received channel estimation signal, transmits precoded downlink data to the scheduled user. For example, if a linear precoding algorithm is adopted, after the linear precoding, a MIMO signal model may be presented by:

$$y(t)=H(t)w(t)s(t)+n(t) \quad (1)$$

H(t) denotes the channel state information (CSI) between the scheduled user and the base station, w(t) denotes the linear precoding matrix, s(t) denotes the channel estimation signal or the downlink data signal, t denotes the time that the signal is transmitted, n(t) denotes noises, and y(t) denotes received signals at the UE.

In various embodiments of the present disclosure, after the base station transmits the precoded reference signal to the scheduled user at the first time instance, the UE calculates the SINR on each resource block according to the received reference signal, and feeds back a CQI to the base station. After receiving the CQI fed back by the UE, the base station performs downlink data transmission, i.e., transmits the precoded downlink data to the scheduled user at the second time instance. The base station may determine the modulation and coding scheme for the downlink data according to the CQI fed back by the UE, and it may also serve as a basic for updating the first precoding mode subsequently.

In various embodiments of the present disclosure, after the base station transmits the precoded reference signal to the scheduled UE at the first time instance, besides the CQI, the UE may further feed back PMI and/or RI according to the received reference signal. For example, for precoding based on codebook, PMI and RI matching the current channel state best may be selected from the codebook according to a certain rule, and the PMI and/or RI may be fed back to the base station. After receiving the information (i.e., CQI, PMI/RI) fed back by the UE, the base station performs precoding to the downlink data according to the precoding matrix corresponding to the scheduled user in the first precoding mode, and transmits the precoded downlink data at the second time instance. The base station may determine the modulation and coding scheme for the downlink data according to the CQI fed back by the UE, and it may also serve as a basic for updating the first precoding mode subsequently.

In various embodiments of the present disclosure, a first precoding mode is configured for the first cell, the first precoding mode records information of a precoding matrix configured for respective candidate user of the first cell on respective resource. A scheduling user is selected from candidate users for each resource according to the first precoding mode, precoding is performed to the channel estimation signal and the downlink data of the scheduling user according to the precoding matrix of the scheduling user, and the precoded channel estimation signal and the precoded downlink data are transmitted to the scheduling user. Thus, the UE does not need to feed back PMI, which reduced the feedback overhead of the UE. Further, the base station uses the same precoding matrix when transmitting the channel estimation signal and when transmitting the downlink data, which makes the ICI from the adjacent cell consistent when the UE estimates the CQI and when receiving the downlink data. Thus, the accuracy of the CQI estimation may be improved effectively, and the base station is able to determine the modulation and coding scheme and the number of resource blocks to be scheduled more accurately according to the CQI. Therefore, the system throughput and the user throughput are both improved.

Figure 2:
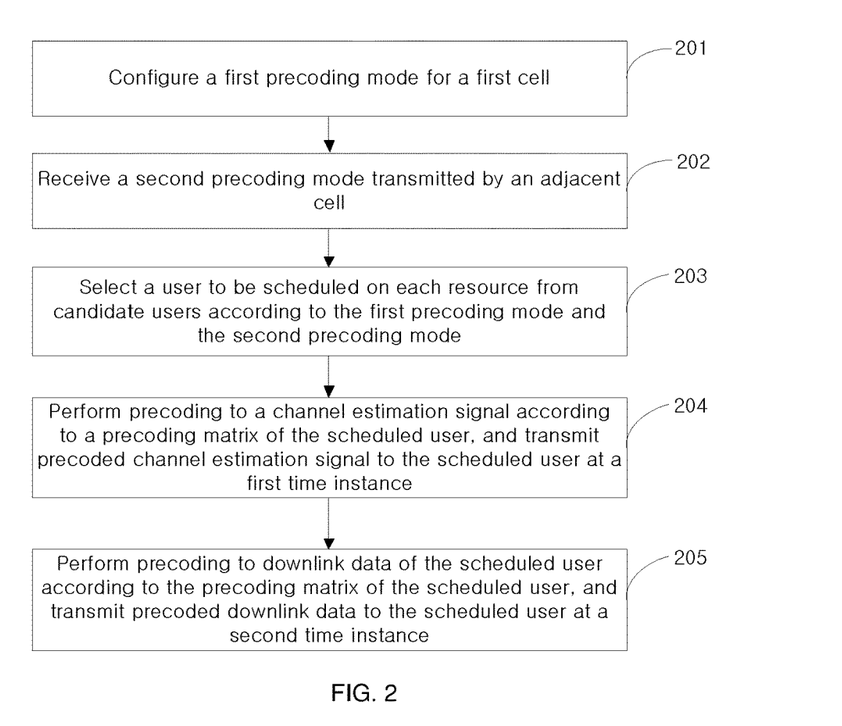
FIG. 2 is a flowchart illustrating another precoding method according to various embodiments of the present disclosure.

FIG. 2 is a flowchart illustrating another downlink precoding method according to various embodiments of the present disclosure. The method includes the following.

At block 201, a first precoding mode is configured for a first cell, the first precoding mode records information of a precoding matrix configured for respective candidate user in the first cell on respective resource.

In various embodiments, the first cell is a serving cell, the process of configuring the first precoding mode for the first cell includes: determining statistical channel characteristic of each candidate user on each resource, wherein the statistical channel characteristic may be an average value of instantaneous CSI between the UE and the base station of the first cell during a predefined period of time; determining the precoding matrix for each candidate user according to its statistical channel characteristic; and recording information of the precoding matrix in the first precoding mode.

In particular, in the LTE system, the base station may obtain the statistical channel characteristic by calculating an average value according to channel state information fed back by each candidate user in previous slots. Then, the base station selects a matching PMI from the preconfigured codebook according to the statistical channel characteristic of each candidate user. A PMI with the maximum channel capacity may be determined as a matching PMI. In addition, the base station may re-calculate the statistical channel characteristic periodically in every predefined time period and update the first precoding mode.

At block 202, a second precoding mode transmitted by an adjacent cell is received, the second precoding mode records information of a precoding matrix of the adjacent cell on respective resource.

In various embodiments, multiple cells participate in cooperative transmission. The base stations of the multiple cells inform each other of their precoding patterns and the codebooks configured for the common frequency resources. The base station of the first cell receives the second precoding mode transmitted by the base station of an adjacent cell, and can know the PMI used on each resource according to the second precoding mode. The information interaction between the base stations may be implemented via a wired transmission.

In various embodiments, the second precoding mode may be similar as the PMI mapping table as shown in Table 1, i.e., information of the PMI used by candidate users (group) in the adjacent cell on the resources are configured. Similarly, the base station of the first cell transmits the first precoding mode to the base station of the adjacent cell, and the base station of the adjacent cell knows after receiving the first precoding mode that: on subbands 1, 3, 5 and 7, PMI1 and PMI2 are used; on subbands 2 and 4, PMI2 is used; on subbands 6 and 8, PMI1 is used.

In various embodiments, the second precoding mode may be a simplified PMI mapping table, i.e., merely the information of the PMI used on the resources is indicated. Compared with Table 1, the simplified PMI mapping table is shown in Table 2, wherein the indexes of the PMIs used on subbands are shown.

TABLE 2 the second precoding mode -- simplified PMI mapping table

| | Subband index | | | | | | | |
|---|---|---|---|---|---|---|---|---|
| | 1 | 2 | 3 | 4 | 5 | 6 | 7 | 8 |
| Index of used PMI | PMI1, PMI2 | PMI2 | PMI1, PMI2 | PMI2 | PMI1, PMI2 | PMI1 | PMI1, PMI2 | PMI1 |

In addition, after the multiple base stations participating in the cooperative transmission update the precoding mode, they transmit the updated precoding mode to others participating in the cooperative transmission for use of the subsequent scheduling.

At block 203, a user to be scheduled on each resource is selected from the candidate users according to the first precoding mode and the second precoding mode.

In this block, for each resource, candidate users on this resource and a first precoding matrix configured for each of the candidate users are determined according to the first precoding mode, a second precoding matrix used by the adjacent cell on this resource is determined according to the second precoding mode; a throughput of each candidate user on this resource is calculated according to the first precoding matrix and the second precoding matrix, and the candidate user with the maximum throughput is determined as the user to be scheduled on this resource.

The throughput may be represented by the SINR of the candidate user on the resource which is calculated according to the first precoding matrix and the second precoding matrix. In particular, a received signal power of the candidate user is calculated according to the first precoding matrix, an inter-cell interference power between the first cell and the second cell is calculated according to the first precoding matrix and the second precoding matrix, and the SINR is calculated according to the received signal power and the inter-cell interference power.

For example, after the linear precoding, the SINR may be calculated as follows:

$$SINR_k(t) = \frac{P_S(t)}{P_{Int}(t) + P_N}, k = 1, \ldots, K \quad (2)$$

$SINR_k(t)$ denotes the SINR obtained by the UE on the k-th subband at time t, K denotes the total number of subbands, $P_S(t)$ denotes the received signal power, $P_{Int}(t)$ denotes the inter-cell interference power, i.e., the sum of the power of downlink interference signals from respective adjacent cell on the resource, $P_N$ denotes noise power.

In various embodiments, the candidate users configured for each resource in the first precoding mode is divided into multiple user groups, each user group includes one or more users. With respect to each user group, the first precoding matrix for each candidate user in the user group recorded in the first precoding mode is determined, i.e., each user group may correspond to one or multiple first precoding matrixes. The throughput of each candidate user on the resource is calculated according to the first precoding matrix and the second precoding matrix. The throughputs of all candidate users in the user group are added and the added result is taken as the throughput of the user group on the resource. The user group with the maximum throughput is determined as the user to be scheduled on the resource.

With reference to the first precoding mode as shown in Table 1, the candidate users are divided into three user groups on each subband. When a user group includes one user and corresponds to one first precoding matrix, the formula for calculating the SINR shown in formula (2) may be denoted by:

$$SINR_k(t) = \frac{w(t)_{k,0}^* H(t)_{k,0}^* H(t)_{k,0} w(t)_{k,0}}{w(t)_{k,0}^* \sum_{i \in \Phi} H(t)_{k,i}^* H(t)_{k,i} w(t)_{k,i} + P_N} \quad (3)$$

$H(t)_{k,0}$ denotes the downlink channel matrix between the serving base station of the first cell and the UE on the k-th subband at time t; $H(t)_{k,i}$ denotes the downlink channel matrix between the i-th interfering base station of the adjacent cell and the UE on the k-th subband at time t; $w(t)_{k,0}$ denotes the precoding matrix configured by the serving base station of the first cell for the UE on the k-th subband at time t, i.e., the first precoding matrix; $w(t)_{k,i}$ denotes the precoding matrix used by the i-th interfering base station of the adjacent cell on the k-th subband at time t, i.e., the second precoding matrix; $\Phi$ denotes an adjacent cell set; $(\ )^*$ denotes a conjugate transpose operation.

In various embodiments, the second precoding matrix may be determined as follows: searching for at least one precoding matrix preconfigured for the resource in the second precoding mode, and taking a weighted sum of the at least one precoding matrix as the second precoding matrix. For example, referring to the second precoding mode as shown in Table 2, the precoding matrix $\omega_1$ denoted by PMI1 and the precoding matrix $\omega_2$ denoted by PMI2 are used on subband 1, then the second precoding matrix $w(t)_{k,i} = \beta_1 \omega_1 + \beta_2 \omega_2$, wherein $\beta_1$ and $\beta_2$ respectively denotes two preconfigured weights, and $\beta_1 + \beta_2 = 1$. The value of $\beta_1$ and $\beta_2$ may be configured by the base station of the first cell, which is not restricted in the present disclosure.

Referring to the first precoding mode as shown in Table 1, when the user group includes two users and corresponds to two first precoding matrixes, the $SINR_{k,j}(t)$ of each user j in the user group may be obtained according to formula (3), and the sum of the SINRs of all candidate users in the user group is taken as the total SINR on the k-th subband, denoted by:

$$SINR_k(t) = \sum_{j=1}^{M} SINR_{k,j}(t) \quad (4)$$

M denotes the total number of candidate users in the user group.

At block 204, the channel estimation signal is precoded according to the precoding matrix of the scheduled user, and the precoded channel estimation signal is transmitted to the scheduled user at the first time instance.

The channel estimation signal may be a reference signal, the precoding matrix of the scheduled user may be adopted to perform precoding to the reference signal.

At block 205, the downlink data of the scheduled user is precoded using the precoding matrix of the scheduled user, and the precoded downlink data is transmitted to the scheduled user at the second time instance, wherein the second time instance is later than the first time instance.

For example, in the LTE system, the first time instance and the second time instance are identified by indexes of downlink subframes, respectively n1 and n2. In a time division duplex (TDD) system, n2=n1+4. The detailed value of the first time instance and the second time instance are not restricted in the embodiments of the present disclosure.

In addition, considering that the PMI used by the base station during downlink data transmission and the PMI reported by the UE may be different, in order to ensure that the UE is able to know the equivalent channel after the precoding and perform coherent demodulation to the downlink data, the base station may explicitly indicate the information of the PMI used by the base station in downlink control signaling, e.g. the index of the PMI. Or, the base station may transmit dedicated reference signal to the UE to enable the UE to acquire the PMI used by the base station, e.g., the w(t) in the above formula (1). Or, the base station transmits dedicated reference signal to the UE to enable the UE to acquire the equivalent channel information, i.e., channel state information after the precoding, e.g., the (t)w(t) in the above formula (1).

In the above embodiments, through receiving the second precoding mode transmitted by the adjacent cell, and selecting the user to be scheduled on each resource from the candidate users according to the first precoding mode and the second precoding mode, it is realized to share the precoding patterns between multiple cells. Therefore, the base station of the first cell is able to know the second precoding matrixes at the two time instances when it transmits the reference signal and the downlink data, which further improves the accuracy for estimating the SINR during the scheduling, and improves the system throughput and the user throughput.

Figure 3:
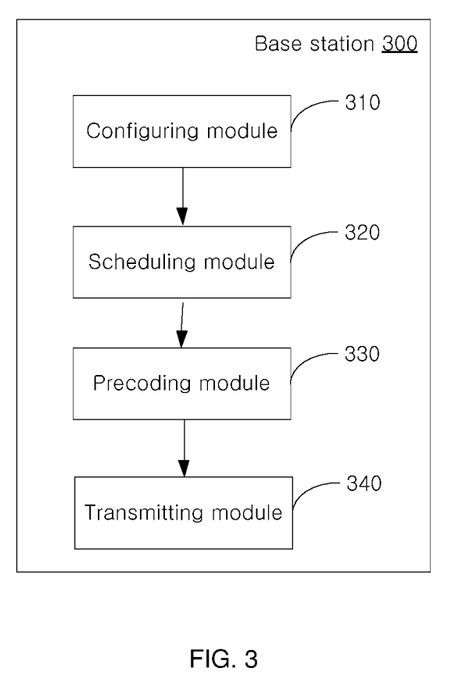
FIG. 3 is a block diagram illustrating a structure of a base station according to various embodiments of the present disclosure.

FIG. 3 is a block diagram illustrating a structure of a base station 300 according to various embodiments of the present disclosure. The base station 300 includes:

a configuring module 310, to configure a first precoding mode for a first cell, wherein the first precoding module records information of a precoding matrix configured for respective candidate user of the first cell on respective resource;

a scheduling module 320, to select a user to be scheduled on each resource from candidate users according to the first precoding mode configured by the configuring module 310;

a precoding module 330, to perform precoding to channel estimation signal and downlink data of the scheduled user selected by the scheduling module 320 using the precoding matrix of the scheduled user selected by the scheduling module 320; and a transmitting module 340, to transmit the channel estimation signal and the downlink data precoded by the precoding module 330 to the scheduled user.

Figure 4:
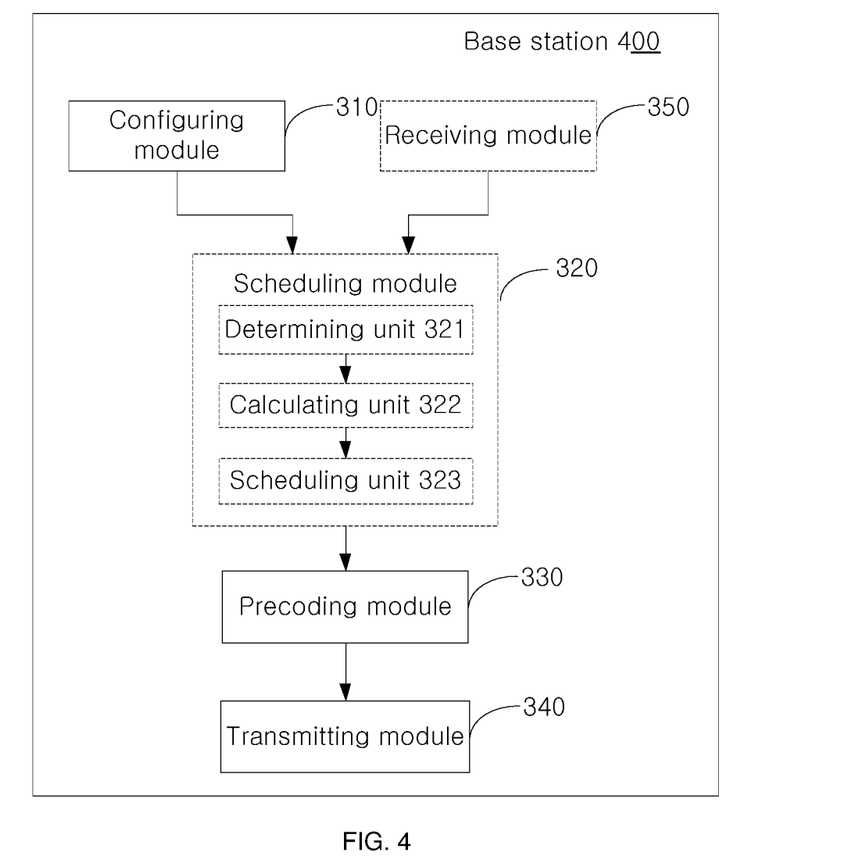
FIG. 4 is a block diagram illustrating another structure of a base station according to various embodiments of the present disclosure.

FIG. 4 is block diagram illustrating a structure of a base station 400 according to various embodiments of the present disclosure. Based on the base station 300 shown in FIG. 3, the base station 400 further includes:

a receiving module 350, to receive a second precoding mode transmitted by an adjacent cell, wherein the second precoding mode records information of a precoding matrix used by the adjacent cell on each resource;

accordingly, the scheduling module 320 includes:

a determining unit 321, to determine, with respect to each resource, candidate users on this resource and the first precoding matrix configured for each of the candidate users according to the first precoding mode configured by the configuring module 310; determine, according to the second precoding mode received by the receiving module 350, a second precoding matrix used by the adjacent cell on this resource;

a calculating unit 332, to calculate a throughput of each candidate user on this resource according to the first precoding matrix and the second precoding matrix determined by the determining unit 321; and a scheduling unit 323, to determine a candidate user with the maximum throughput calculated by the calculating unit 322 as the user to be scheduled on this resource.

In various embodiments, the determining unit 321 is further to: divide the candidate users configured for each resource in the first precoding mode into multiple user groups; with respect to each user group, determine a first precoding matrix for each candidate user in the user group recorded in the first precoding mode;

the calculating unit 322 is further to: calculate the throughput of each candidate user on this resource according to the first precoding matrix and the second precoding matrix, add the throughputs of all candidate users in the user group, and take the sum of the throughputs as the throughput of the user group on this resource; and the scheduling unit 323 is further to: take the user group with the maximum throughput as the user to be scheduled on this resource.

In various embodiments, the determining unit 321 is further to: search for at least one precoding matrix configured for each resource in the second precoding mode, and take a weighted sum of the at least one precoding matrix as the second precoding matrix.

In various embodiments, the calculating unit 322 is further to: calculate a received signal power of the candidate user according to the first precoding matrix, calculate an inter-cell interference power between the first cell and an adjacent cell according to the first precoding matrix and the second precoding matrix, and calculate an SINR according to the received signal power and the ICI power.

In various embodiments, the configuring module 310 is further to: determine a statistical channel characteristic of each candidate user on each resource, configure a precoding matrix for each candidate user according to the statistical channel characteristic, and record the information of the precoding matrix in the first precoding mode.

In various embodiments, the transmitting module 320 is further to: transmit precoded channel estimation signal to the scheduled user; after receiving CQI fed back by the scheduled user according to the received channel estimation signal, transmit precoded downlink data to the scheduled user.

Figure 5:
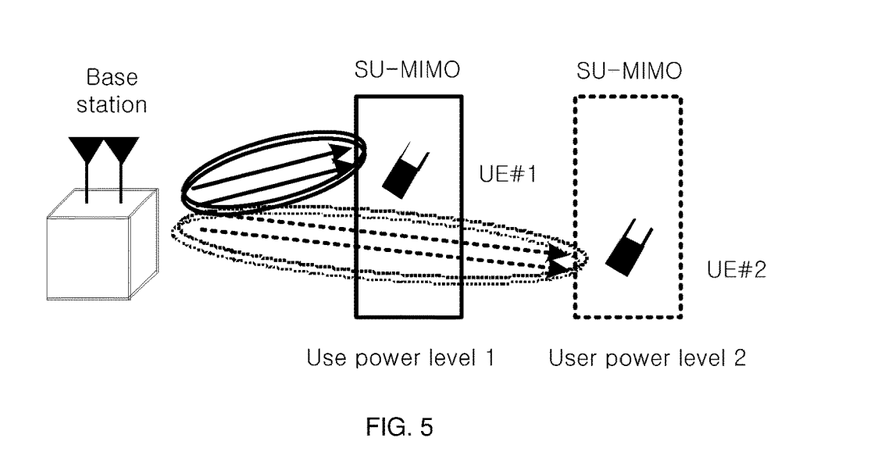
FIG. 5 is a schematic diagram illustrating an implementation environment according to various embodiments of the present disclosure.

FIG. 5 is a schematic diagram illustrating an implementation environment according to various embodiments of the present disclosure. The base station is equipped with two antennas, respectively for SU-MIMO transmission with UE#1 and UE#2. Since the channel quality of UE#1 and that of UE#2 have a large difference, the base station may also adopt the NOMA transmission during downlink scheduling, i.e., overlapping the transmission signals of UE#1 and UE#2 to convert the channel quality difference between them into a duplexing gain. The UEs may perform a demodulation according to a serial interference cancellation technique. In the NOMA transmission, the SU-MIMO transmission on the two links have different transmit powers, UE#1 uses a power restricted by power level 1, and UE#2 uses a power restricted by power level 2.

In LTE standards, there are various transmission modes (TMs) relevant to the precoding. For example, in the transmission mode 3 (TM3), the UE does not need to report PMI, but merely need to report a CQI and a rank index (RI) of the channel, the selection of the precoding matrix is defined in advance, which may be regarded as a blind precoding manner. In this transmission mode, the first precoding mode shown in Table 1 may be adopted to determine the PMI used by a possible user or a user group on each subband.

Hereinafter, performance in case that the downlink precoding method provided by the embodiments of the present disclosure is applied and performance in case that the downlink precoding method is not applied are compared through simulation. Table 3 shows system-level parameters used in the simulation. When the downlink precoding method provided by the embodiments of the present disclosure is absent, the method of determining the precoding matrix for the downlink data transmission according to the PMI fed back by the UE in the conventional LTE system is adopted, it is shortened as a feedback-based method.

TABLE 3

| simulation parameters | | |
|---|---|---|
| Parameters | | Value |
| Cell layout | | Hexagonal grid, 19 cell sites, Wrap around |
| Inter-site distance | | 500 m |
| Carrier frequency | | 2.0 GHz |
| Overall transmission bandwidth | | 10 MHz |
| Resource block bandwidth | | 180 kHz |
| Number of resource blocks | | 48 |
| Number of users per sector | | 10, 20 |
| BS transmit antenna | Number of antennas | 2 |
| | Antenna gain | 14 dBi |
| User receive antenna | Number of antennas | 2 |
| | Antenna gain | 0 dBi |
| Maximum transmission power | | 46 dBm |
| Distance dependent path loss | | $128.1 + 37.6\log_{10}(r)$, r. kilometers (dB) |
| Shadowing standard deviation | | 8 dB |
| Channel model | | 3GPP Spatial Channel Model (SCM), Urban Macro |
| Receiver noise density | | −174 dBm/Hz |
| User speed | | 3 km/h |
| Maximum number of multiplexed UEs | | m = 1 (OMA) m = 2 (NOMA) |
| MCS selection | | Target BLER: lower than 10% |
| Rank report interval | | 100 msec |
| CQI/PMI feedback interval | | 10 msec |
| HARQ | | null |
| Traffic model | | Full Buffer |

Figure 6:
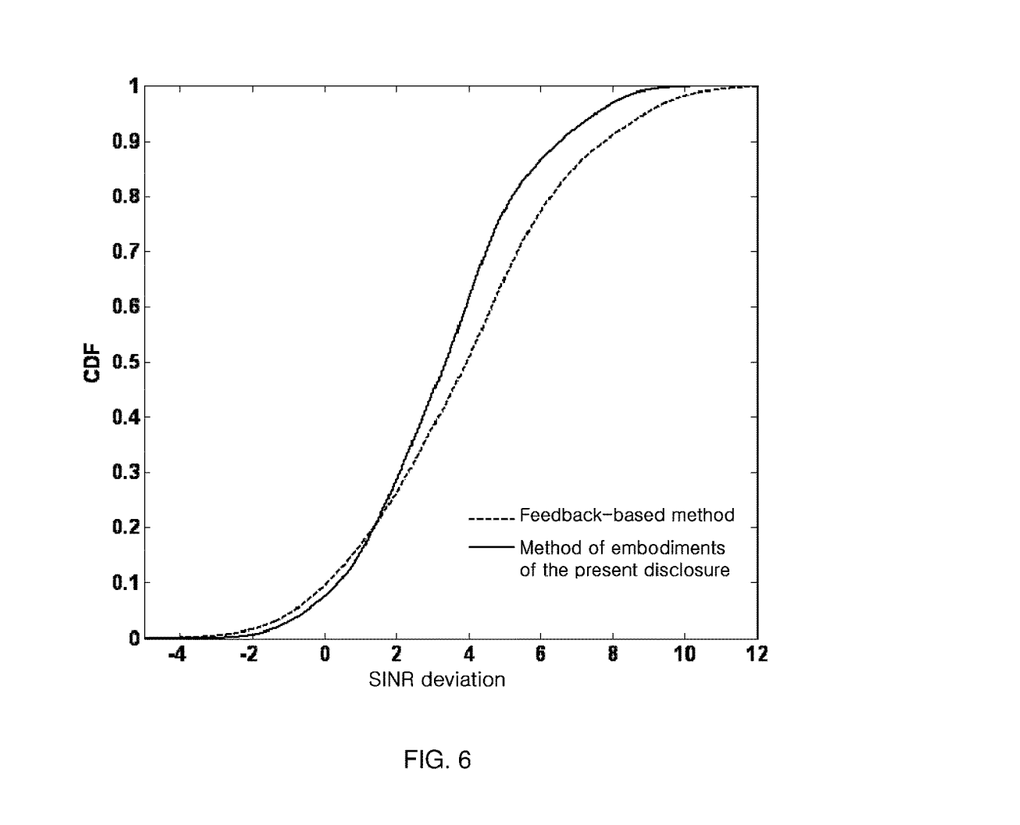
FIG. 6 is a schematic diagram illustrating SINR estimation derivations in case that the downlink precoding method of the embodiments of the present disclosure is applied and in case that it is not applied.

FIG. 6 is a schematic diagram illustrating comparison of SINR estimation deviations in case that the downlink precoding method provided by the embodiments of the present disclosure is applied and in case that it is absent. The SINR estimation deviation refers to a difference between the SINR estimated according to the precoded channel estimation signal transmitted to the scheduling user and the actual SINR for the downlink data. It can be seen from cumulative distribution function (CDF) curves of the SINR estimation deviation that, after the downlink precoding method provided by the embodiments of the present disclosure is applied, the SINR estimation deviation is decreased effectively.

Figure 7:
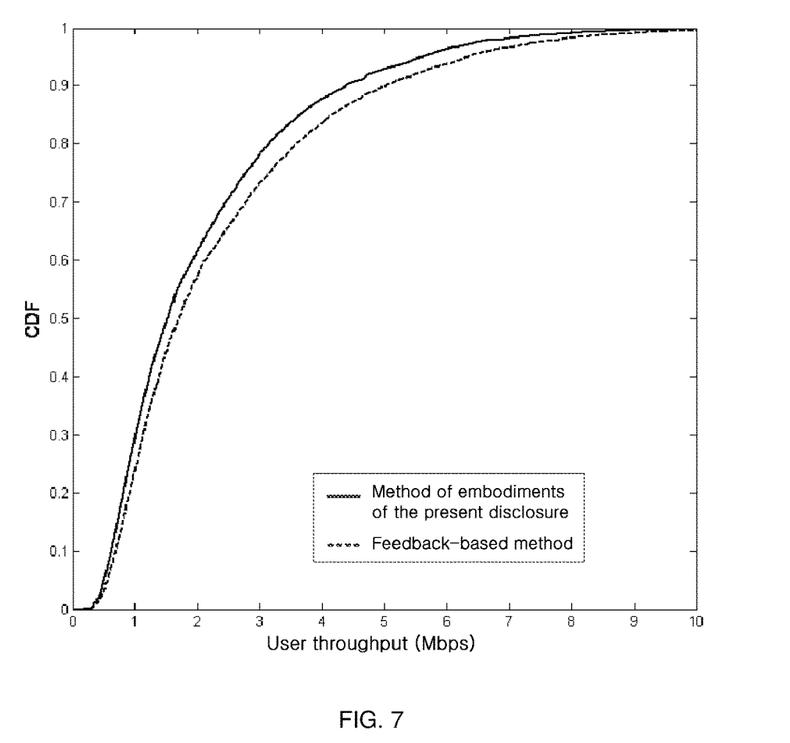
FIG. 7 is a schematic diagram illustrating comparison of user throughput in case that the downlink precoding method provided by the embodiments of the present disclosure is applied and the user throughput in case that downlink precoding method is not applied.

FIG. 7 is a schematic diagram illustrating comparison of user throughput in case that the downlink precoding method provided by the embodiments of the present disclosure is applied and the throughput in case that it is absent. It can be seen from the CDF curves of the user throughput that, after the downlink precoding method provided by the embodiments of the present disclosure is applied, the user throughput is improved apparently.

Figure 8:
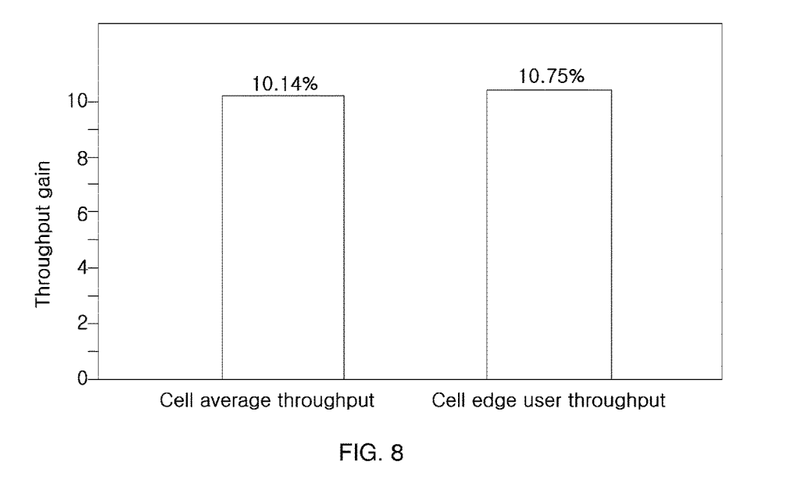
FIG. 8 is a schematic diagram illustrating comparison of performance in case that the downlink precoding method provided by the embodiments of the present disclosure is applied and performance in case that the downlink precoding method is not applied.

FIG. 8 is a schematic diagram illustrating comparison of performance in case that the downlink precoding method provided by the embodiments of the present disclosure is applied and the performance in case that it is absent. The performance includes a cell average throughput and a cell edge user throughput. It can be seen that, after the downlink precoding method provided by the embodiments of the present disclosure is applied, both the two parameters have a throughput gain of about 10%.

Figure 9:
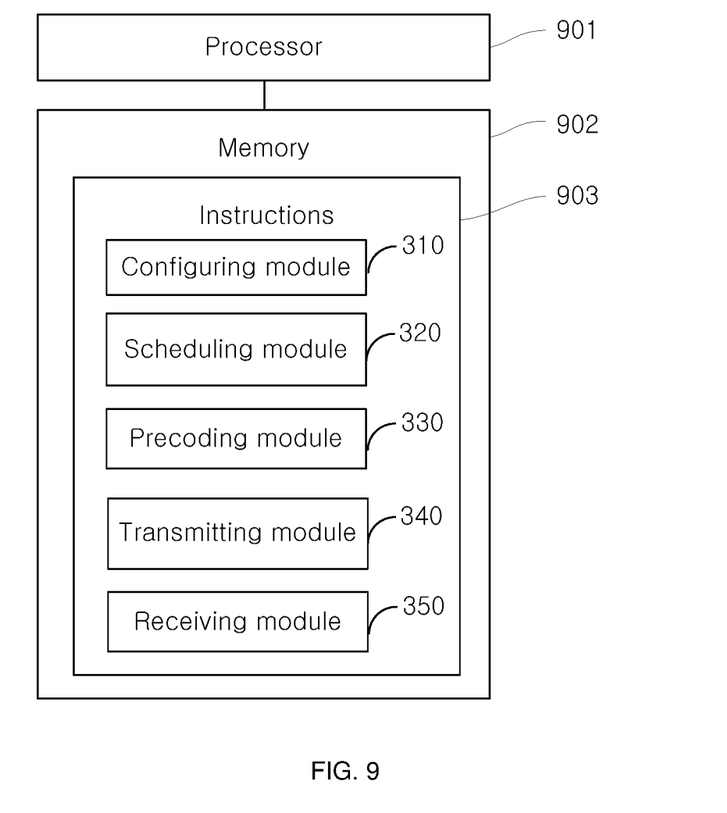
FIG. 9 is a block diagram illustrating another structure of a base station according to various embodiments of the present disclosure.

FIG. 9 is a block diagram illustrating another structure of a base station according to various embodiments of the present disclosure. As shown in FIG. 9, the base station includes one or more processors 901, a memory 902 and one or more instruction units 903 which are stored in the memory 902 and are executable by the one or more processors 901. The instruction units 903 include a configuring module 310, a scheduling module 320, a precoding module 330, a transmitting module 340 and a receiving module 350. These functional modules include instructions respectively for implementing the functions of the modules. When the processor 901 communicates with the memory 902, reads and executes the instructions, the base station implements the corresponding functions.

According to the downlink precoding method provided by the embodiments of the present disclosure, a first precoding mode is configured for the first cell. The first precoding mode records information of a precoding matrix configured for respective candidate user of the first cell on each resource. Thus, the UE does not need to feedback PMI, which reduces feedback overhead. Further, it is possible to receive a second precoding mode transmitted by an adjacent cell, select a scheduling user for each resource from the candidate users according to the first precoding mode and the second precoding mode. Thus, through the cooperative transmission of the cells, the base station is able to know the precoding matrix used by the adjacent cell, which makes the SINR calculated more accurate when scheduling users. Further, the base station performs precoding to the channel estimation signal and the downlink data of the scheduling user according to the precoding matrix of the scheduling user, which makes the ICI from the adjacent cell consistent when the UE estimates the CQI and when receiving the downlink data. Thus, the accuracy of the CQI estimation may be improved effectively, and the base station is able to determine the modulation and coding scheme and the number of resource blocks to be scheduled more accurately according to the CQI. Therefore, the downlink scheduling accuracy is improved. The simulation result shows that, the system throughput and the user throughput are both improved to some extent.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The invention claimed is:

1. A downlink precoding method, comprising:
configuring a first precoding mode for a first cell, wherein the first precoding mode includes information of a precoding matrix configured for each candidate user of the first cell on each resource;
selecting a scheduling user on each resource from candidate users according to the first precoding mode;
performing precoding to a channel estimation signal and downlink data of the scheduling user according to a precoding matrix of the scheduling user, and transmitting precoded channel estimation signal and precoded downlink data to the scheduling user;
receiving a second precoding mode transmitted by an adjacent cell, wherein the second precoding mode includes information of a precoding matrix used by the adjacent cell on each resource;
the selecting the scheduling user on each resource from the candidate users according to the first precoding mode comprises:
with respect to each resource, determining candidate users on this resource and a first precoding matrix configured for each of the candidate users according to the first precoding mode;
determining a second precoding matrix used by the adjacent cell on this resource according to the second precoding mode;
calculating a throughput of each of the candidate users on the resource according to the first precoding matrix and the second precoding matrix; and
determining a candidate user with a maximum throughput as the scheduling user on the resource.

2. The method of claim 1, wherein the calculating the throughput of each of the candidate users on the resource according to the first precoding matrix and the second precoding matrix and determining the candidate user with the maximum throughput as the scheduling user on the resource comprises:
dividing the candidate users on the resource in the first precoding mode into multiple user groups;
with respect to each user group, determining the first precoding matrix of each candidate user in the user group recorded in the first precoding mode;
calculating the throughput of each candidate user in the user group on the resource according to the first precoding matrix and the second precoding matrix;
adding the throughput of all candidate users in the user group, and determining a sum of the throughput of all candidate users as a throughput of the user group on the resource; and
determining the user group with a maximum throughput as the scheduling user on the resource.

3. The method of claim 1, wherein the determining the second precoding matrix used by the adjacent cell on the resource according to the second precoding mode comprises:
searching for at least one precoding matrix configured for the resource in the second precoding mode, and determining a weighted sum of the at least one precoding matrix as the second precoding matrix.

4. The method of claim 1, wherein the calculating the throughput of each of the candidate users on the resource according to the first precoding matrix and the second precoding matrix comprises:
calculating a received signal power of each candidate user according to the first precoding matrix;
calculating an inter-cell interference power between the first cell and the adjacent cell according to the first precoding matrix and the second precoding matrix; and
calculating a signal to interference and noise ratio according to the received signal power and the inter-cell interference power.

5. The method of claim 1, wherein the configuring the first precoding mode for the first cell comprises:
determining a statistical channel characteristic of each candidate user on each resource;
configuring the precoding matrix for each candidate user according to the statistical channel characteristic; and
recording the information of the precoding matrix into the first precoding mode.

6. The method of claim 1, wherein the transmitting the precoded channel estimation signal and the precoded downlink data to the scheduling user comprises:
   transmitting the precoded channel estimation signal to the scheduling user;
   after receiving a channel quality indicator fed back by the scheduling user according to the received precoded channel estimation signal, transmitting the precoded downlink data to the scheduling user.

7. A base station, comprising:
   a processor;
   a memory; wherein
   the memory stores instructions executable by the processor that, when executed by the processor, cause the processor to:
   configure a first precoding mode for a first cell, wherein the first precoding mode records information of a precoding matrix of each candidate user on each resource;
   select a scheduling user from candidate users for each resource according to the first precoding mode;
   perform precoding to a channel estimation signal and downlink data of the scheduling user according to a precoding matrix of the scheduling user; and
   transmit precoded channel estimation signal and precoded downlink data to the scheduling user;
   receive a second precoding mode transmitted by an adjacent cell, wherein the second precoding mode records information of a precoding matrix used by the adjacent cell on each resource;
   the instructions cause the processor to select the scheduling user further cause the processor to:
   determine, with respect to each resource, candidate users configured on the resource and a first precoding matrix configured for each of the candidate users according to the first precoding mode, and determine a second precoding matrix used by the adjacent cell on the resource according to the second precoding mode;
   calculate a throughput of each of the candidate users on the resource according to the first precoding matrix and the second precoding matrix; and
   determine a candidate user with a maximum throughput as the scheduling user on the resource.

8. The base station of claim 7, wherein the instructions that cause the processor to determine the candidate users on the resource and the second proceding matrix further cause the processor to: divide the candidate users on the resource in the first precoding mode into multiple user groups, with respect to each user group, determine the first precoding matrix of each candidate user in the user group recorded in the first precoding mode;
   the instructions that cause the processor to calculate the throughput of each of the candidate users further cause the processor to: calculate the throughput of each candidate user on the resource according to the first precoding matrix and the second precoding matrix, add throughputs of all candidate users in the user group, and determine a sum of the throughputs as a throughput of the user group on the resource;
   the instructions that cause the processor to determine the scheduling user further cause the processor to: determine the user group with a maximum throughput as the scheduling user on the resource.

9. The base station of claim 7, wherein the instructions that cause the processor to determine the candidate users on the resource and the second precoding matrix further cause the processor to: search for at least one precoding matrix configured for the resource in the second precoding mode, and determine a weighted sum of the at least one precoding matrix as the second precoding matrix.

10. The base station of claim 7, wherein the instructionst that cause the processor to calculate the throughput of each of the candidate users further cause the processor to: calculate a received signal power of each candidate user according to the first precoding matrix, calculate an inter-cell interference power between the first cell and the adjacent cell according to the first precoding matrix and the second precoding matrix, and calculate a signal to interference and noise ratio according to the received signal power and the inter-cell interference power.

11. The base station of claim 7, wherein the instructions that cause the processor to configure the first precoding mode further cause the processor to: determine a statistical channel characteristic of each candidate user on each resource, configuring the precoding matrix for the candidate user according to the statistical channel characteristic, and record the information of the precoding matrix into the first precoding mode.

12. The base station of claim 7, wherein the instructions that cause the processor to transmit the precoded channel estimation signal and the precoded downlink data further cause the processor to: transmit the precoded channel estimation signal to the scheduling user; after receiving a channel quality indicator fed back by the scheduling user according to the received channel estimation signal, transmit the precoded downlink data to the scheduling user.

13. A non-transitory machine-readable storage medium, comprising: machine-readable instructions executable by a processor that, when executed by the processor, cause the processor to:
   configure a first precoding mode for a first cell, wherein the first precoding mode records information of a precoding matrix of each candidate user on each resource;
   receive a second precoding mode transmitted by an adjacent cell, wherein the second precoding mode includes information of a precoding matrix used by the adjacent cell on each resource;
   select a scheduling user from candidate users for each resource according to the first precoding mode;
   perform precoding to a channel estimation signal and downlink data of the scheduling user according to a precoding matrix of the scheduling user; and
   transmit precoded channel estimation signal and precoded downlink data to the scheduling user;
   wherein the instructions are executable by the processor to:
   with respect to each resource, determining candidate users on this resource and a first precoding matrix configured for each of the candidate users according to the first precoding mode;
   determining a second precoding matrix used by the adjacent cell on this resource according to the second precoding mode;
   calculating a throughput of each of the candidate users on the resource according to the first precoding matrix and the second precoding matrix; and
   determining a candidate user with a maximum throughput as the scheduling user on the resource.

* * * * *